US009554500B2

(12) United States Patent
Smith et al.

(10) Patent No.: US 9,554,500 B2
(45) Date of Patent: Jan. 31, 2017

(54) GRAVITATIONAL LATCH FOR WING LIFT WHEELS

(75) Inventors: David Smith, Fort Jennings, OH (US); Thomas Steffan, Fort Jennings, OH (US)

(73) Assignee: Unverferth Manufacturing Company, Inc., Kalida, OH (US)

(*) Notice: Subject to any disclaimer, the term of this patent is extended or adjusted under 35 U.S.C. 154(b) by 1111 days.

(21) Appl. No.: 12/199,346

(22) Filed: Aug. 27, 2008

(65) Prior Publication Data

US 2010/0051302 A1    Mar. 4, 2010

(51) Int. Cl.
*A01B 63/22* (2006.01)

(52) U.S. Cl.
CPC .......... *A01B 63/22* (2013.01); *Y10T 74/20636* (2015.01)

(58) Field of Classification Search
CPC .... A01B 63/22; A01B 63/10; Y10T 74/20636
USPC . 172/395, 396, 734, 466; 403/322.4; 74/527
See application file for complete search history.

(56) References Cited

U.S. PATENT DOCUMENTS

| 2,580,100 | A | * | 12/1951 | Johansen et al. | 280/414.5 |
| 2,994,544 | A | * | 8/1961 | Wolf | 280/43.23 |
| 3,063,737 | A | * | 11/1962 | Coughran | 280/414.5 |
| 3,643,745 | A | * | 2/1972 | Betulius et al. | 172/413 |
| 3,662,653 | A | * | 5/1972 | Carlson et al. | 92/15 |
| 4,073,345 | A | * | 2/1978 | Miller | 172/413 |
| 4,173,260 | A | * | 11/1979 | van der Lely et al. | 172/49.5 |
| 4,276,814 | A | * | 7/1981 | Bass | 92/23 |
| 4,529,215 | A | * | 7/1985 | Strand | 280/43.23 |
| 4,561,505 | A | * | 12/1985 | Williamson | 172/776 |
| 4,974,684 | A | * | 12/1990 | Stevens | 172/311 |
| 5,009,566 | A | * | 4/1991 | Asche | 414/722 |
| 5,086,847 | A | * | 2/1992 | Meiners | 172/466 |

* cited by examiner

*Primary Examiner* — Thomas B Will
*Assistant Examiner* — Joel F. Mitchell
(74) *Attorney, Agent, or Firm* — Rothwell, Figg, Ernst & Manbeck, P.C.

(57) ABSTRACT

The present application discloses an improvement to hydraulically operated wing lift wheels used in tillage equipment. According to embodiments of the present invention, a hydraulic lockout mechanism is provided that uses gravity to rotate a weighted latch into a position that prevents full retraction of a hydraulic cylinder when in a certain orientation. When in other orientations, the weighted latch is in a position that allows the hydraulic cylinder to fully retract.

6 Claims, 5 Drawing Sheets

GRAVITATIONAL LATCH FOR WING LIFT WHEELS

BACKGROUND OF THE INVENTION

Field of the Invention

The present invention generally relates to mechanical equipment for use in farm implements. More particularly, the present invention relates to a gravitational latch for preventing wing lift wheels in tillage equipment from extending before the wings have completely unfolded.

Description of the Related Art

In farming, tillage machines are used for a variety of purposes. For instance, tillage machines may be used to loosen the soil, mix in fertilizer, shape fields into rows, or generally prepare a field for seeding. A typical tillage machine may have wings on which various farm implements are mounted and wing wheels to support the wings. Modern tillage machines can be massive machines that perform the field preparation over a large area. While having machines of large size is an advantage during tillage, it can make the tillage machines unwieldy during transportation to or from a field. Accordingly, most modern tillage machines can fold from a wide working position to a more compact transport position.

To accomplish the folding from a wide working position to the more compact position, a tillage machine might have a base frame and two folding wings that are folded from the working position to the compact position with the aid of a hydraulic system. The wings may be folded in a variety of different ways. One common way to fold wings involves folding two wings in a crossing pattern with very little clearance between the wings. Each wing may be equipped with a wing lift wheel for raising the wing to turn on the ends of a field or to hold a constant working depth for the machine. The wing lift wheels are frequently retracted by a hydraulic system when the tillage machine is in the transport position and extended only when the tillage machine is unfolded into the working position.

For reasons of economy, it is typically desirable to have a single hydraulic system that controls both the folding/unfolding of the wings and the retraction/extension of the wing lift wheels. A problem associated with the using a single hydraulic system, however, is the risk that the wing lift wheels will extend too quickly as the wings unfold. When this happens, the wing lift wheel of one wing can come into contact with the other wing thereby causing damage to the tillage machine.

Methods of preventing the wing lift wheel from extending before the wings have been completely unfolded are known. One method involves providing a hydraulic lockout valve to lock the hydraulic valve that extends the wing lift wheel thereby preventing it from prematurely extending. Another method involves providing a cylinder transport lock to physically prevent the hydraulic valve that extend the wing lift wheels from moving, thereby preventing the wing lift wheel assembly from extending. Both of these methods have the disadvantage that the operator is required to leave the tractor and physically operate either a lockout valve or a transport lock. It is undesirable to require the operator to leave the tractor because it takes unnecessary effort and time.

Thus, there exists the need for an improved system for preventing the wing lift wheel from extending before the wings have completely unfolded that does not require the operator to leave the tractor.

SUMMARY OF THE INVENTION

According to one embodiment of the present invention, a tilliage machine with a weighted bracket for preventing retraction of a hydraulic cylinder is provided. The weighted bracket has a weighted portion, a curved restrictor portion, a first connection point, and a second connection point, wherein the weighted bracket is rotatably connected to a hydraulic cylinder at first and second connection points.

According to another embodiment of the present invention, a wheel lift assembly is provided. The wheel lift assembly has a weighted bracket that includes a weighted portion and a curved restrictor portion and is rotatably coupled to a hydraulic cylinder. The weighted bracket rotates into a locking position that prevents the hydraulic cylinder from fully retracting when the wheel lift assembly has a first orientation with respect to the direction of the force of gravity. The weighted bracket is arranged to rotate into an unlocked position that allows free movement of the hydraulic cylinder when the wheel lift assembly has a second orientation with respect to the direction of the force of gravity.

According to another embodiment of the present invention, in a wing lift wheel assembly, a method of locking a hydraulic cylinder is provided. First, the method provides a weighted bracket comprising a weighted portion and a curved restrictor portion. Next, the weighted bracket is rotatably coupled to the weighted bracket to the hydraulic cylinder such that when the wheel lift assembly has a first orientation with respect to the direction of the force of gravity the weighted bracket rotates into a locking position where the curved restrictor portion prevents the hydraulic cylinder from fully retracting and when the wheel lift assembly has a second orientation with respect to the direction of the force of gravity, the weighted bracket rotates into an unlocked position that allows free movement of the hydraulic cylinder.

Further applications and advantages of various aspects and embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
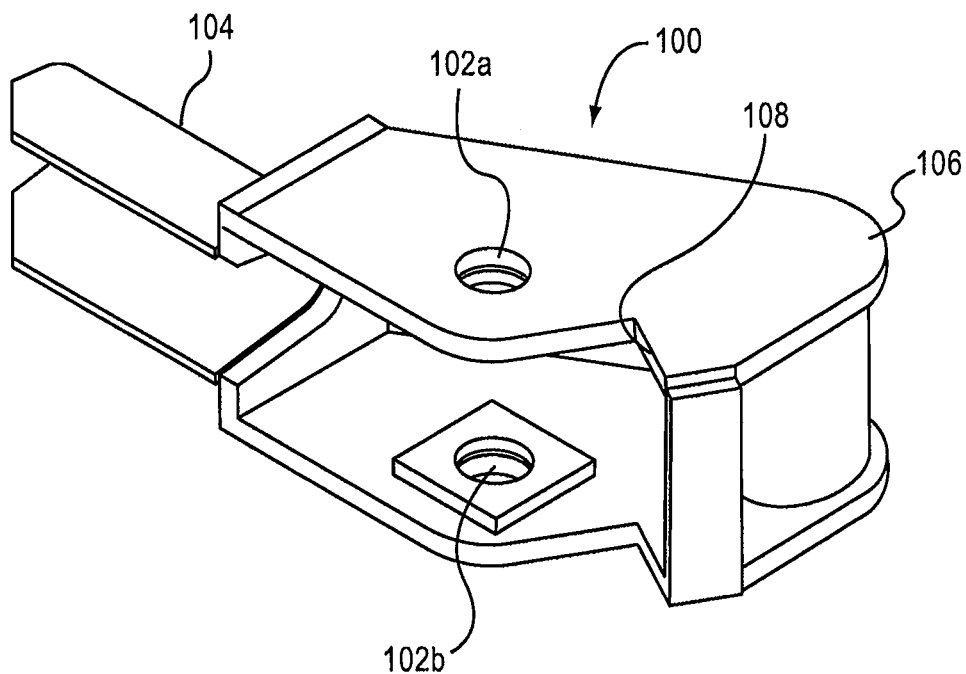
FIG. 1 depicts an exemplary gravity lock weighted bracket according to one embodiment of the present invention.
Figure 2:
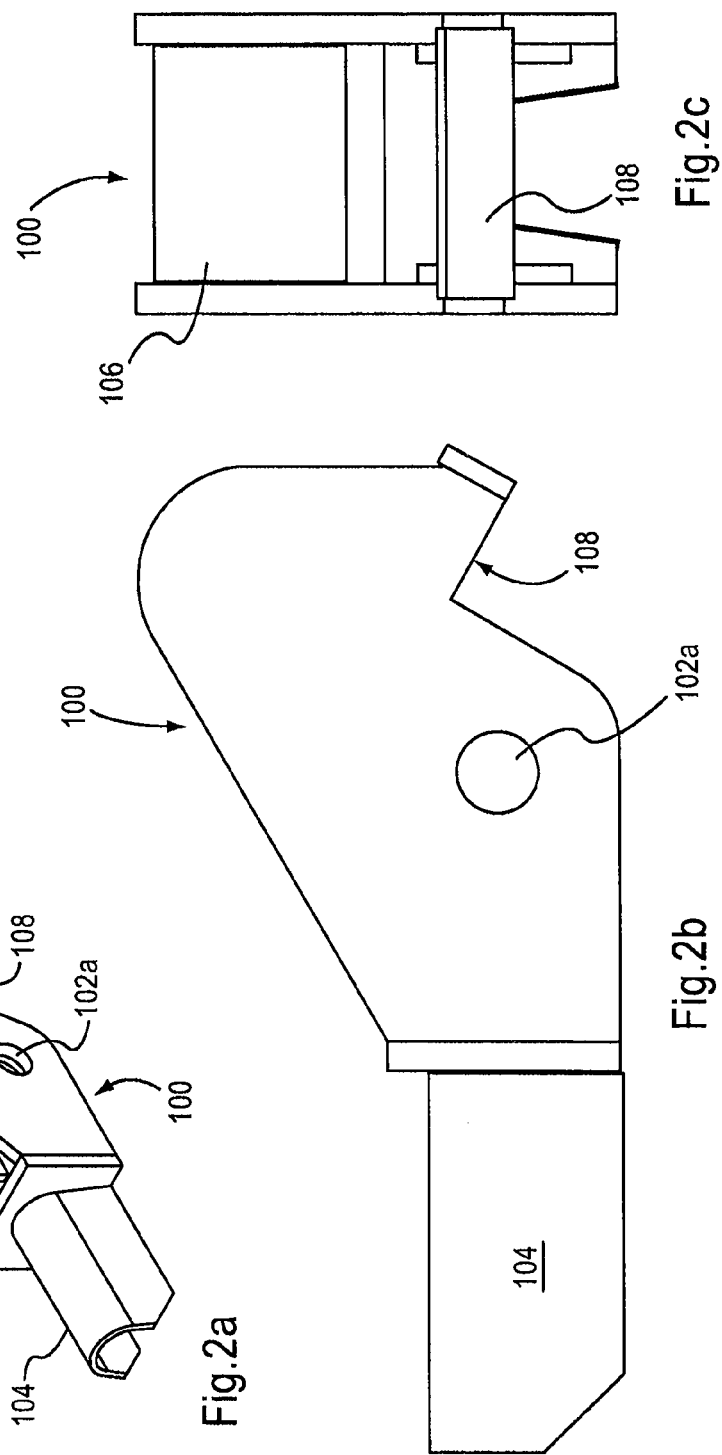
FIG. 2a depicts an orientation of gravity lock weighted bracket according to one embodiment of the present invention.
FIG. 2b depicts a gravity lock weighted bracket with a side orientation according to one embodiment of the present invention.
FIG. 2c depicts a gravity lock weighted bracket with a rear orientation according to one embodiment of the present invention.

FIG. 1 illustrates an exemplary gravity lock weighted bracket 100 according to one embodiment of the present invention and FIGS. 2a-c depict weighted bracket 100 from different angles according to one embodiment of the present invention. Weighted bracket 100 can be rotatably coupled to a hydraulic cylinder (not shown) at connection points 102a and 102b. When connected to the cylinder, weighted portion or end 106 is of sufficient weight to cause the weighted bracket 100 to rotate about connection points 102a and 102b with the direction of gravitational force.

According to embodiments of the invention, the weighted bracket 100 may be attached to the hydraulic cylinder by inserting a pin through connection points 102a and 102b. Additionally, other suitable means of rotatably coupling the weighted bracket 100 to the cylinder may be used. When rotated into the locking position, restrictor 104 restricts retraction of the hydraulic cylinder. When rotated into the unlocked position, the cylinder is free to retract. Stopper 108 keeps weighted bracket 100 from rotating too far away from the cylinder, which would impair its function.

Figure 3:
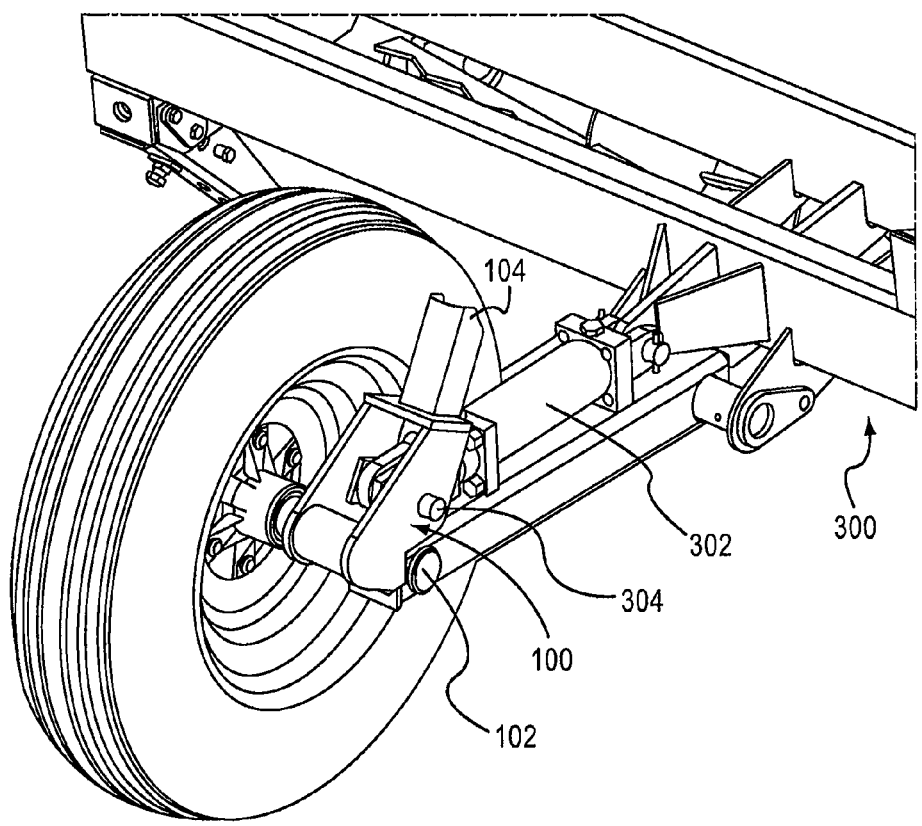
FIG. 3 depicts a weighted bracket installed on tillage equipment in the unlocked position according to one embodiment of the present invention.

FIG. 3 depicts a weighted bracket 100 installed on tillage equipment 300 in the unlocked position. The weighted bracket 100 is attached to hydraulic cylinder 302 at connection point 102 by pin 304. As can be seen, the cylinder 302 is retracted fully and restrictor 104 is positioned above cylinder, which allows the cylinder to fully retract.

Figure 4:
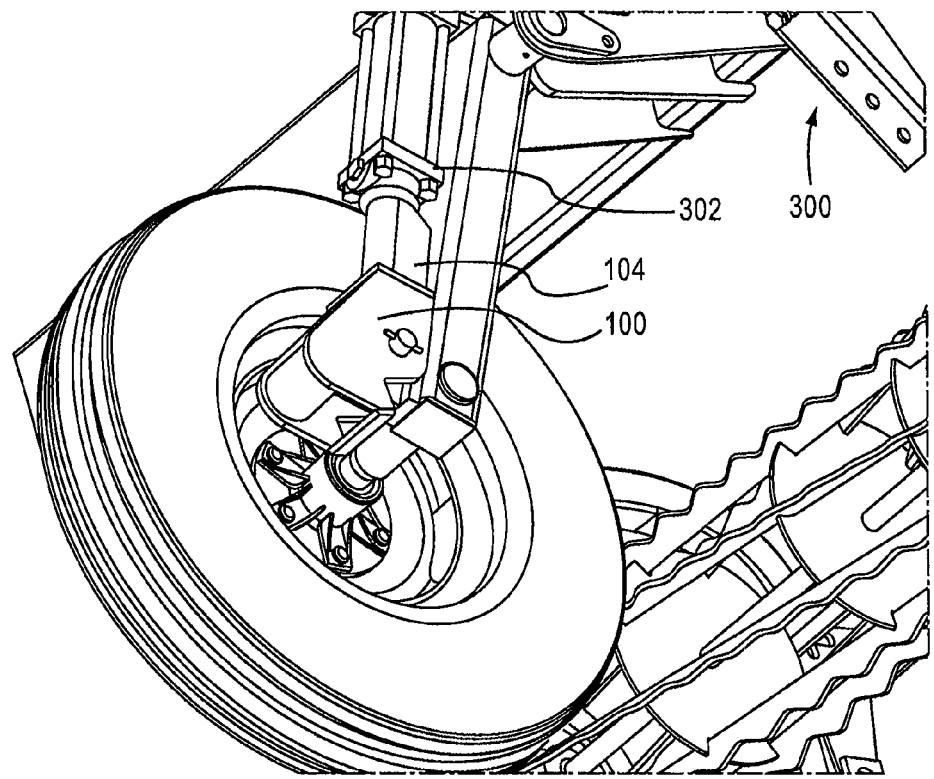
FIG. 4 depicts a weighted bracket installed on tillage equipment in the locked position according to one embodiment of the present invention.

FIG. 4 depicts the same weighted bracket 100 of FIG. 3, but in the locked position. As can be seen, the restrictor 104 of the weighted bracket is positioned such that it prevents cylinder 302 for fully retracting. Restrictor 104 is held in place by pressure from the cylinder 302 attempting to retract. When the pressure is eliminated (i.e. by extending the cylinder), the weighted bracket 100 is free to rotate again, as depicted in FIG. 5.

Figure 5:
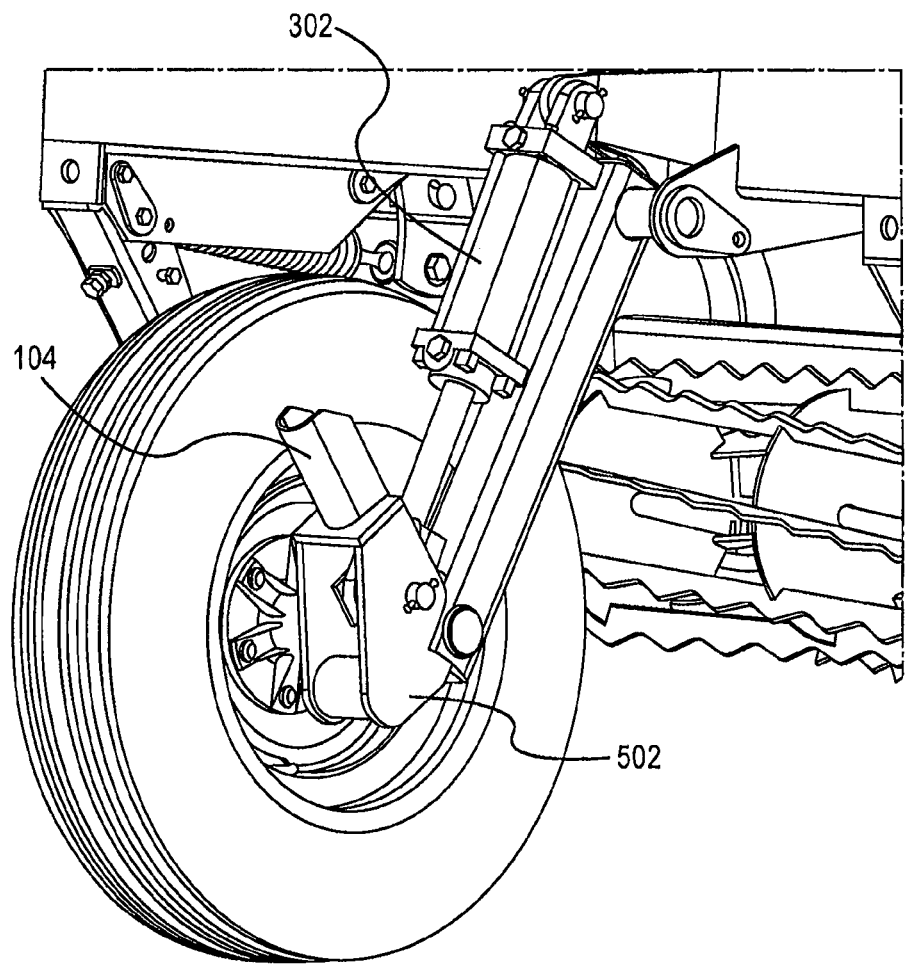
FIG. 5 depicts a weighted bracket installed on tillage equipment in the unlocked position according to one embodiment of the present invention.

In FIG. 5, it can be seen that the plunger 502 of the hydraulic cylinder 302 has extended thereby relieving the pressure on the weighted bracket 100, which allows restrictor 104 to swing away from the cylinder 302.

The bracket 100 is preferably formed of material having sufficient strength and durability for use in a farm implement, such as steel or other metal alloys. Further, one skilled in the art should readily understand that the bracket can be forged, welded, cast, or manufactured by other suitable means.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

We claim:

1. A weighted bracket adjusted to be rotatably connected to a hydraulic cylinder at first and second connection points, said weighted bracket comprising:
    a bracket body having said first and second connection points;
    a curved restrictor portion coupled to an end portion of said bracket body and configured to restrict the retraction of a hydraulic cylinder connected to the bracket body; and
    a weighted portion coupled with an end portion of said bracket body such as to cause the weighted bracket to rotate about said first and second connection points with the direction of gravity,
    wherein said weighted portion is positioned at the end portion of the bracket body opposite said curved restrictor portion and said first and second connection points are positioned between said curved restrictor portion and said weighted portion.

2. A wheel lift assembly comprising:
    a weighted bracket that comprises a weighted portion and a curved restrictor portion and can be rotatably coupled to a hydraulic cylinder at first and second connection points,
    wherein said weighted portion is positioned at an end portion of the weighted bracket opposite said curved restrictor portion and said first and second connection points are positioned between said curved restrictor portion and said weighted portion,
    wherein when the wheel lift assembly has a first orientation with respect to the direction of the force of gravity the weighted bracket rotates into a locking position that prevents the hydraulic cylinder from fully retracting and when the wheel lift assembly has a second orientation with respect to the direction of the force of gravity, the weighted bracket rotates into an unlocked position that allows free movement of the hydraulic cylinder.

3. In a wing lift wheel assembly, a method of locking a hydraulic cylinder comprising:
    providing a weighted bracket comprising a weighted portion and a curved restrictor portion;
    rotatably coupling the weighted bracket to the hydraulic cylinder;
    positioning said weighted portion at an end portion of the weighted bracket opposite the curved restrictor portion such that the position where the weighted bracket is coupled to the hydraulic cylinder is between said weighted portion and said curved restrictor portion,
    wherein said weighted portion is positioned such that when the wheel lift assembly has a first orientation with respect to the direction of the force of gravity the weighted bracket rotates into a locking position where the curved restrictor portion prevents the hydraulic cylinder from fully retracting and when the wheel lift assembly has a second orientation with respect to the direction of the force of gravity, the weighted bracket rotates into an unlocked position that allows free movement of the hydraulic cylinder.

4. A tillage machine comprising:
    at least one wing capable of being unfolded from a transport position to a working position and folded from a working position to a transport position in response to force applied to the wing from a hydraulic system;
    a wheel assembly mounted on the wing configured to extend and retract in response to force applied to the wheel assembly by a hydraulic cylinder connected to the hydraulic system; and
    a weighted bracket rotatably connected to the hydraulic cylinder at first and second connection points, said weighted bracket comprising a weighted portion configured to cause the weighted bracket to rotate about first and second connection points with the direction of gravity, and a curved restrictor portion configured to restrict the retraction of a hydraulic cylinder wherein said weighted portion is positioned at an end portion of the weighted bracket opposite said curved restrictor portion and said first and second connection points are positioned between said weighted portion and said curved restrictor portion.

5. A tillage system comprising:
   means for moving a folding wing from a working position to a transport position and from a transport position to a working position;
   means for extending and retracting a folding wing lift wheel coupled to the folding wing; and
   means for keeping the means for extending and retracting the folding wing lift wheel from fully retracting while the folding wing is moving from a working position to a transport position or from a transport position to a working position.

6. A weighted bracket adjusted to be rotatably connected to a hydraulic cylinder at first and second connection points, said weighted bracket comprising:
   a bracket body means having a first and second connection means;
   a means for weighting coupled to said bracket body such as to cause the bracket body means to rotate about said first and second connection means with the direction of gravity; and
   a restrictor portion means configured to restrict the retraction of a hydraulic cylinder connected to the bracket body;
   wherein said means for weighting is positioned at an end portion of the weighted bracket opposite the restrictor portion means and the first and second connection means are positioned between said means for weighting and restrictor portion means.

* * * * *